US005873156A

United States Patent [19]
Wark

[11] Patent Number: 5,873,156
[45] Date of Patent: Feb. 23, 1999

[54] COAL PULVERIZER AND METHOD OF IMPROVING FLOW THEREIN

[75] Inventor: Rickey E. Wark, Longview, Tex.

[73] Assignee: Sure Alloy Steel Corporation, Madison Heights, Mich.

[21] Appl. No.: 735,693

[22] Filed: Nov. 1, 1996

Related U.S. Application Data

[63] Continuation of Ser. No. 374,005, Jan. 18, 1995, abandoned, which is a continuation-in-part of Ser. No. 135,726, Oct. 13, 1993, Pat. No. 5,386,619.

[51] Int. Cl.$^6$ .............................. B23P 17/04; B02C 15/04

[52] U.S. Cl. .............................. 29/401.1; 241/52; 241/57; 241/80; 241/109; 241/119

[58] Field of Search .............................. 29/401.1; 241/52, 241/57, 58, 60, 81, 103, 109, 115–121

[56] References Cited

U.S. PATENT DOCUMENTS

| | | | |
|---|---|---|---|
| 1,834,094 | 12/1931 | Fraser | 241/109 X |
| 1,963,469 | 6/1934 | Kühr . | |
| 4,049,203 | 9/1977 | McKenzie | 241/57 X |
| 4,085,897 | 4/1978 | Hahn et al. | 241/57 X |
| 4,192,469 | 3/1980 | Jäger . | |
| 4,234,132 | 11/1980 | Maliszewski, Jr. | 241/57 X |
| 4,606,506 | 8/1986 | Okada et al. | 241/109 |
| 4,687,145 | 8/1987 | Dougan et al. | 241/57 |
| 4,694,994 | 9/1987 | Henne et al. . | |
| 4,715,544 | 12/1987 | Folsberg | 241/57 |
| 5,251,831 | 10/1993 | Yoshida et al. . | |

FOREIGN PATENT DOCUMENTS

| | | | |
|---|---|---|---|
| 3515444 | 10/1986 | Germany | 241/57 |

OTHER PUBLICATIONS

Ni–Hard Vane Wheel Arrangement.
"Figure E. Classifier Discharge Section" Babcock & Wilcox Customer Parts and Services.
"Figure B. Top Housing and Swing Valve Assembly" Babcock & Wilcox Customer Parts and Services.

*Primary Examiner*—Timothy V. Eley
*Attorney, Agent, or Firm*—Young & Basile, P.C.

[57] ABSTRACT

An improved coal pulverizer classifying system including a classifier cone extension to protect coal flow into the pulverizer from the annular fine-lifting airflow from the pulverizer throat. The classifier cone extension replaces traditional intermittent discharge structure, improving flow through the classifier system and reducing the disruptive effects of the discharge on the annular flow from the pulverizer throat. The pulverizer feedpipe outlet is located in the classifier cone extension, but above the throat of the extension to prevent interference between the feedpipe and the flow of coal through the extension. In a preferred form an adjustable clearance cone is mounted for vertical adjustment on the lower end of the feedpipe.

10 Claims, 3 Drawing Sheets

COAL PULVERIZER AND METHOD OF IMPROVING FLOW THEREIN

RELATED APPLICATIONS

This application which is a continuation of U.S. patent application Ser. No. 08/374,005 filed Jan. 18, 1995, now abandoned, which is a continuation-in-part of U.S. patent application Ser. No. 08/135,726, filed Oct. 13, 1993 now U.S. Pat. No. 5,386,619.

FIELD OF THE INVENTION

The invention relates in general to coal pulverizers, and more particularly to improvements in the coal feed and classifier cone structure associated with such pulverizers.

BACKGROUND OF THE INVENTION

Coal-fired combustion systems such as those used in large utility applications require finely-ground coal particles or "fines" for efficient operation. In general, it is desirable to use only very-finely pulverized coal in such systems in order to keep NOX emissions and oversized loss-on-ignition (LOI) unburned coal particles from contaminating the marketable ash byproduct of the combustion chamber. It is accordingly important to maintain close control over the fineness of the pulverized coal fed into the combustion system.

Bowl mill-type pulverizers, such as the type disclosed in U.S. Pat. No. 4,687,145, are commonly used to grind the coal and classify the resulting fines. A vertical feedpipe drops raw coal from several feet above the pulverizer to the center of the pulverizer for grinding. An annular and upwardly-directed flow of air through a ring-shaped "throat" blows the ground coal particles up and around the pulverizer to a classifier system and combustion chute feeding the combustion chamber. The classifier system removes oversized particles of coal from the flow of air and coal fines, returning them to the pulverizer for regrinding.

A known system for classifying these upwardly traveling fines consists of an inverted classifier cone mounted above the pulverizer and concentric with the feedpipe that delivers raw coal to the center of the pulverizer. The lower, smaller outlet end of the classifier cone essentially surrounds the outlet end of the feedpipe, while the larger, upper inlet or mouth of the cone surrounds the combustion delivery chute.

A stationary ring of classifier vanes is mounted at the mouth of the cone to receive the annular, upward flow of pulverized coal/air from the pulverizer and redirect it into the classifier cone in a centrifugal flow. As the coal fines and air swirl around in the classifier cone, the heavier particles gravitate to the sides and settle out at the bottom of the cone, while the lighter, more finely ground fines are swirled up and into the entrance of the combustion delivery chute.

As the heavier particles of coal collect at the bottom of the classifier cone, they are typically contained by a flapper valve assembly at the bottom of the cone, comprising a series of vertically hanging plates blocking the openings of one or more outlet chutes. The plates are relatively heavy, and are forced open only intermittently by the weight of the accumulated coal at the bottom of the classifier cone. These fine "rejects" then fall into the bowl mill pulverizer along with incoming raw coal from the feedpipe for regrinding.

There are a number of disadvantages inherent in prior art systems such as those described above.

The prior art positioning of the feedpipe and classifier cone outlets well above the pulverizer often results in fine rejects being blown back up through or around the classifier cone when the flapper assembly opens for a discharge. This is primarily due to the position of the outlets relative to the annular flow of coal fines/air from the pulverizer throat.

Moreover, the flapper assembly and other prior art intermittent cone discharge systems such as "hula skirt" assemblies (circular arrangements of overlapping metal leaves) can become stuck in an open position, adding to the problem of fine reject backflow into the combustion delivery chute and further defeating the function of the classifier cone.

In U.S. patent application Ser. No. 08/135,726 filed Oct. 13, 1994, I disclosed an improvement upon the prior art coal pulverizer systems described above wherein the various air and coal flow paths throughout the pulverizer are optimized to prevent them from interfering with one another. In one form of that invention the feedpipe and classifier cone are extended to eliminate the adverse effects of the annular fine-lifting air flow from the pulverizer throat on the function of the classifier cone, to improve the intrinsic functioning of the classifier cone, and to eliminate the need for complex and unreliable intermittent discharge structure in the classifier cone.

This is generally achieved by extending the feedpipe and classifier cone such that the drop-points for raw coal from the feedpipe and for reject fines from the cone are within, rather than above, the pulverizer. These extensions significantly reduce the tendency of the annular, fine-lifting flow around the outside of the pulverizer to deviate and work back up against the flow of raw coal and fine rejects into the pulverizer.

The reject fines spiraling down the cone around the feedpipe are further drawn into the pulverizer by an improved pressure flow effect from the extended feedpipe in a manner which prevents diversion of the fines back up into or around the classifier cone.

In a particular embodiment of my previous invention, the flapper valve or other intermittent discharge structure is removed from the classifier cone outlet, and replaced with a continuous flow feedpipe extension extending well below the original classifier cone outlet to a point proximate the grinding surface of the pulverizer. The classifier cone is extended in similar fashion with an extension concentric with the feedpipe and extending into the pulverizer to a point proximate the feedpipe extension outlet. In a preferred form the classifier cone extension extends into the pulverizer slightly farther than the feedpipe extension, with its outlet slightly below that of the feedpipe extension, such that the raw coal flow through the feedpipe creates a desirable pressure flow effect drawing the reject fines from the cone into the pulverizer.

The continuous-flow feedpipe and classifier cone extensions, when properly adjusted relative to the pulverizer and its annular fine-lifting airflow, provide a steady flow equilibrium not attainable with the intermittent discharge structure which they replace.

Occasionally, however, the dimensions and geometry of the feedpipe and the classifier cone are such relative to one another that the feedpipe extension interferes with the flow of coal fines through the classifier cone extension. For example, the feedpipe may be oversize in diameter to accommodate a required feed rate, with the result that the feedpipe extension fits too closely within the classifier cone extension for proper flow between the feedpipe extension and the cone extension.

SUMMARY OF THE INVENTION

The problem described above is solved with the present invention by leaving the feedpipe its original length, or by providing a shortened feedpipe extension, such that the feedpipe outlet terminates above the throat of the classifier cone extension. In a preferred form the feedpipe outlet terminates within the cone extension above the throat of the extension.

In a further form of the present invention, an adjustable clearance device is retained on the lower end of the feedpipe or the feedpipe extension adjacent the throat of the classifier cone extension. The clearance device is vertically adjustable on the feedpipe to regulate the size of the annular flow path around the lower end of the feedpipe relative to the throat of the classifier cone extension as needed, without interfering with the classifier cone extension.

These and other features and advantages of the invention will become apparent upon a further reading of the specification.

DETAILED DESCRIPTION OF THE DRAWINGS

Figure 1:
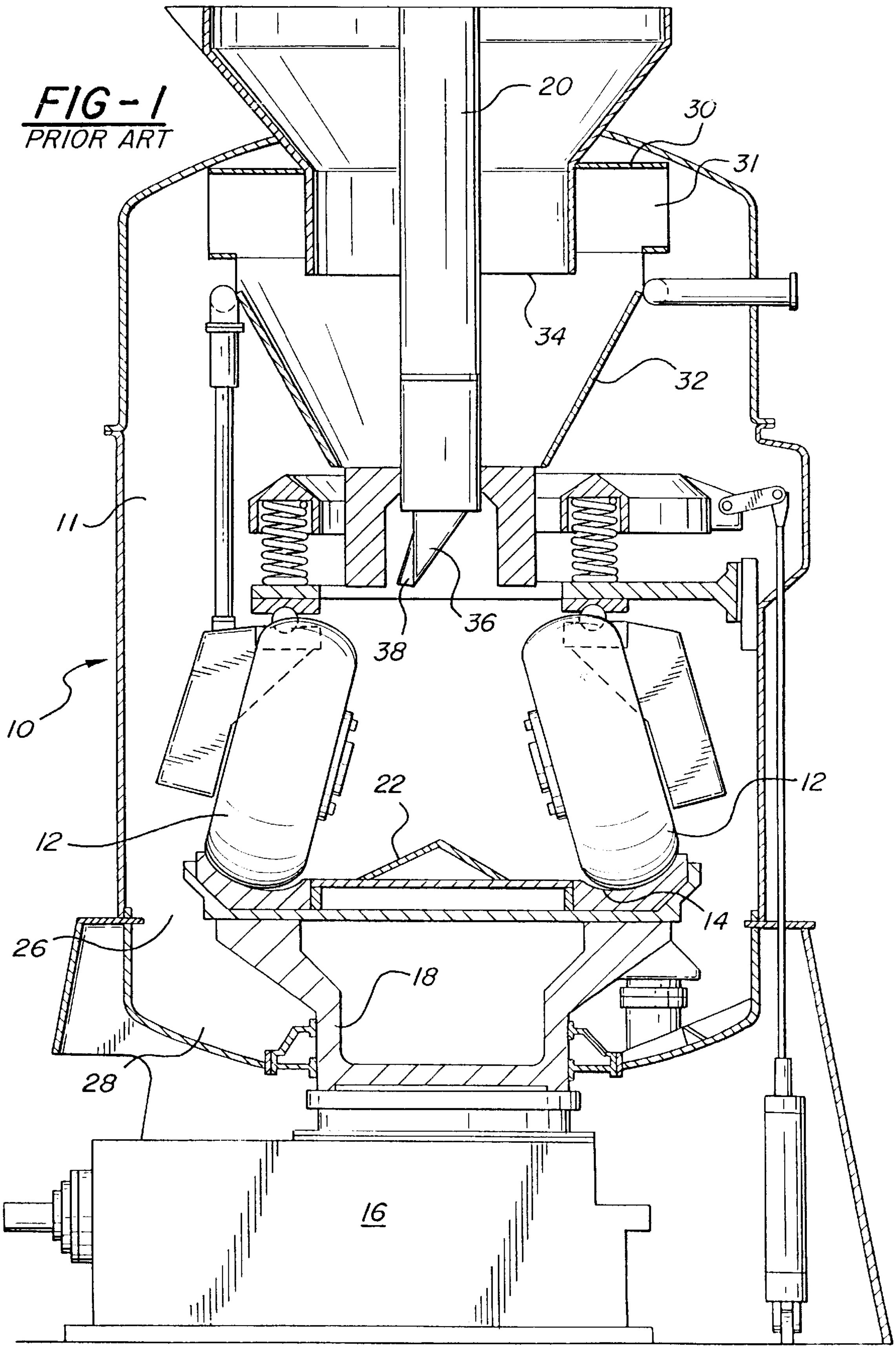
FIG-1 PRIOR ART
FIG. 1 is a side section view of a prior art classifier system in a bowl mill pulverizer.

Referring first to FIG. 1, a known bowl mill-type pulverizer 10 is shown in partial side section, comprising a pair of grinding rollers 12 mating with the grinding surfaces of the grinding ring 14. Grinding ring 14 is driven by a standard drive system shown schematically at 16 and a connecting yoke 18 for rotating ring 14 relative to rollers 12. A feedpipe 20 extends from a suitable storage mechanism to deliver raw coal by gravity feed to the center of the bowl mill pulverizer 10. The incoming coal is diverted by a deflector 22 radially outward to the grinding rollers 12 and grinding ring 14, where it is crushed or ground into a relatively fine particulate form.

The base of pulverizer 10 includes a surrounding, ring-shaped pulverizer throat region 26 fed with air from an outside source via plenum 28 to deliver an annular flow of air up and around the periphery of pulverizer 10. Pulverizer throat region 26 may be provided with a throat (not shown) having a number of fixed or adjustable vanes or deflectors which determine the velocity of air flow. A particularly useful throat and vane/deflector structure is disclosed, for example, in my U.S. Pat. No. 5,186,404.

The upward, annular air flow through pulverizer throat 26 lifts the ground coal particles from ring 14 up and around pulverizer 10 in region 11 to the top of the pulverizer. The velocity of air through throat 26 performs an initial classifying function by lifting and carrying only coal particles below a certain size.

The upper end of the pulverizer housing is provided with a further classifying system comprising a classifier ring 30 having a horizontal inlet 31 about its periphery, an inverted classifier cone 32, and a combustion delivery chute 34. Classifier ring 30, classifier cone 32 and combustion delivery chute 34 are mounted in concentric fashion about feedpipe 20. The upper end of classifier cone 32 surrounds the combustion delivery chute 34, with classifier ring 30 filling the gap therebetween. The annular lifting flow of air and coal fines from pulverizer throat 26 accordingly enters cone 32 and combustion delivery chute 34 through classifier ring 30.

Classifier ring 30 includes a number of fixed vanes (not shown) which impart a centrifugal component to the air and coal fine flow entering the cone from region 11 of the pulverizer. As the coal fines and air swirl around in the classifier cone, the heavier particles gravitate to the sides and settle out at the bottom of the cone, while the lighter, more finely ground fines are swirled up and into the combustion delivery chute to the combustion chamber.

As the heavier particles of coal drop to the bottom of the classifier cone, they are contained by a "flapper" or similar intermittent discharge assembly 36 at the bottom of the cone, which releases these collected fine rejects to the pulverizer for regrinding. FIG. 1 shows a common type of flapper assembly comprising a series of vertically hanging plates blocking the openings of one or more outlet chutes in the bottom of cone 32. The plates are hingedly mounted, and are relatively heavy, such that they are forced open only intermittently by the weight of the accumulated reject fines at the bottom of the classifier cone.

Other types of intermittent discharge structure are known in the art, but the form of the intermittent discharge structure is not important to the present invention.

Still referring to FIG. 1, it can be seen that the height or drop-point of the outlets of the feedpipe 20 and classifier cone 32 are spaced well above the grinding apparatus 12, 14 of pulverizer 10. I have found through experience that this positioning subjects the raw coal flow from the feedpipe and the intermittent reject discharge from the classifier cone to the effects of the annular air flow from the pulverizer throat 26. Turbulence and deviation of the annular air flow around and above the pulverizer grinding structure 12, 14 is aggravated by the air flow disturbances created in the region of the feedpipe and classifier cone outlets as raw coal and reject fines are continuously or intermittently dumped onto grinding ring 14. Accordingly, not only does the position of the prior art feedpipe and classifier cone outlets inherently expose the downward coal flow to air flow disturbances, but it further compounds the magnitude and effect of those disturbances.

The result is oversized reject fines and small pieces of the raw feed coal being blown back up through or around the classifier cone, thereby thwarting its classifying function. These oversized particles can end up being delivered to the combustion chamber through the combustion delivery chute 34, reducing the effectiveness of the combustion process, wasting coal and contaminating the marketable ash byproduct with LOI lumps.

The flapper or other intermittent discharge structure 36 is also subject to mechanical jamming or malfunction. Moreover, the intermittent nature of the fine reject discharge further increases the disruptive effects of the fine rejects on the overall flow equilibrium of the pulverizer.

Figure 2:
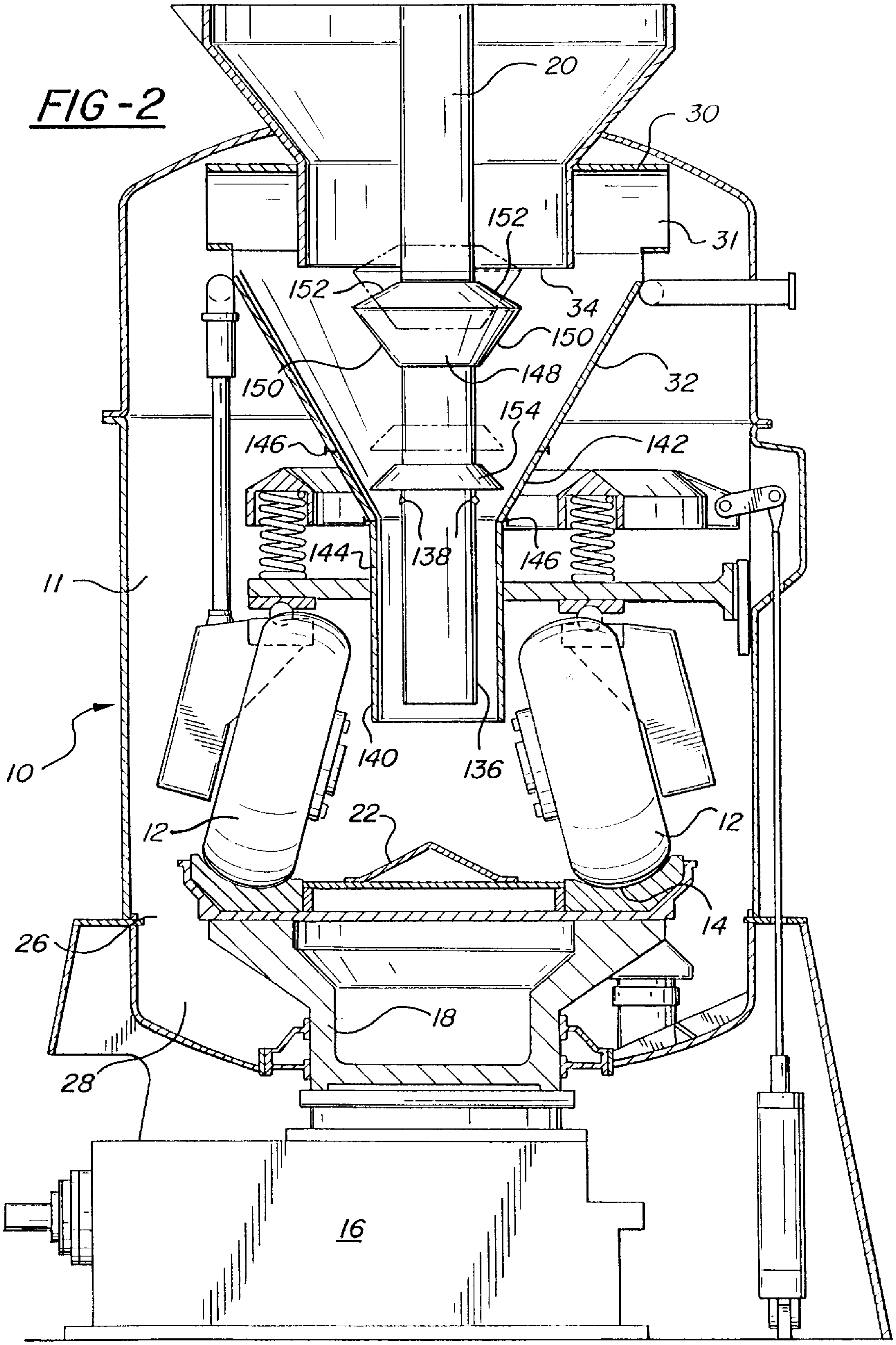
FIG. 2 is a side section view of a classifier system according to my previously disclosed invention, also in a bowl mill pulverizer.

Referring now to FIG. 2, a number of structural modifications to prior art pulverizer classifying systems are shown according to my U.S. Pat. No. 5,386,619. In FIG. 2 the general pulverizer structure is the same as that, shown in FIG. 1, and is referred to by the same reference numerals. However, flapper assembly structure 36, 38 has been replaced by a cylindrical feedpipe extension 136 and a sectional classifier cone extension 140. This modification of classifier cone 32 and feedpipe 20, and the corresponding elimination of the intermittent discharge flapper structure 36, 38 greatly improves the air and coal flow throughout the pulverizer and classifier system and the control over the fineness of coal ultimately delivered to the combustion chamber.

As shown in FIG. 2, feedpipe extension 136 is a cylindrical extension bolted or otherwise securely fastened to the end of feedpipe 20 at 138, for example by welding. Of course, other suitable ways of connecting the feedpipe extension to the feedpipe will be apparent to those skilled in the art. In the illustrated embodiment, the feedpipe extension extends approximately five to six feet below the original feedpipe outlet, to a point within grinding rollers 12 and no more than two to three feet above deflector 22 and grinding ring surfaces 14. The feedpipe extension 136 accordingly extends well below the original outlet or drop-point of feedpipe 20 and classifier cone 32 located above the pulverizer structure, to a point within the confines of the grinding structure and adjacent the grinding surface.

Sectional classifier cone extension 140 is similarly securely fastened to classifier cone 32 at 146, in the illustrated embodiment by suitable bolt structure. Cone extension 140 includes an upper cone-shaped portion 142 contiguous with classifier cone 32, and a cylindrical tailing portion 144 concentric with and parallel to feedpipe extension 136. The outlet of classifier cone extension 140 adjacent the grinding structure 12, 14 is located slightly below the outlet of feedpipe extension 136, creating a desirable pressure flow effect described in more detail below.

Although in the illustrated embodiment the feedpipe and classifier cone extensions 136, 140 are shown as retrofit, bolt-on extensions of the original classifier structure, it will be apparent to those skilled in the art that the feedpipe 20 and/or classifier cone 32 could be originally manufactured with the extended portions 136, 140 to be located relative to the pulverizer structure as shown in FIG. 2. It is expected, however, that the primary market for extensions 136, 140 will be as retrofit devices to existing prior art structures.

The extension of the classifier cone in the manner described above produces a number of desirable results with respect to the flow of coal and air throughout the pulverizer and classifier system.

Classifier cone extension 140 isolates the fine reject discharge from the annular airflow out of the pulverizer throat 26 in region 11, and simultaneously prevents the discharge from aggravating any disturbances in that annular airflow. The effective lengthening of the angled classifier cone 32 by sectional cone portion 142 allows more time for the coal fines to be swirled around and classified in cone 32, providing more control over the size of the fines ultimately fed to the combustion chamber via delivery chute 34. Additionally, the reject fines which require regrinding in the pulverizer spiral down around the feedpipe and are further drawn by the feedpipe flow onto the pulverizer in a manner which decreases the likelihood of reject fines being blown back up into or around the classifier cone. The location of the classifier cone extension outlet below the mouth of the feedpipe enhances this pressure flow or draw, created by the raw coal flowing downward between the parallel walls of feedpipe extension 136 and cone extension 140.

Of course, the elimination of the unreliable intermittent discharge structure 36, 38 reduces the chance of clogging or jamming at the cone outlet. The continuous-flowing nature of the cone extension 140 further helps maintain a smooth flow equilibrium between the downwardly-flowing reject fines and the annular fine-lifting flow from throat 26; intermittent discharge structure tends to upset this equilibrium.

An additional feature of the present invention is an adjustable classifier venturi 148 mounted on the upper end of feedpipe 20 adjacent the inlet of combustion delivery chute 34. Classifier venturi 148 is vertically adjustable on feedpipe 20 toward and away from the mouth of delivery chute 34 via any suitable mechanical or motorized control means (not shown).

Classifier venturi 148 defines two sets of venturi surfaces: lower venturi surfaces 150 and upper surfaces 152. By raising and lowering the classified venturi relative to combustion delivery chute 34, the velocity and angle of the coal fines exiting cone 32 can be adjusted with a great degree of control. When venturi 148 is raised, thereby reducing the size of the combustion chute inlet, the escape velocity of coal fines and air increases in accordance with well-known principles. At the same time, the opposing angle upper and lower venturi surfaces 150, 152 adjust the exit angle of the air and coal fines, reducing the exit angle to a progressively more vertical direction parallel to delivery chute 34 at feedpipe 20.

Conversely, as classifier venturi 148 is lowered away from the inlet of delivery chute 34, the exit velocity is decreased and the exit angle correspondingly increases in somewhat arcuate fashion, becoming progressively more angled relative to the delivery chute 34 and feedpipe 20.

Figure 3:
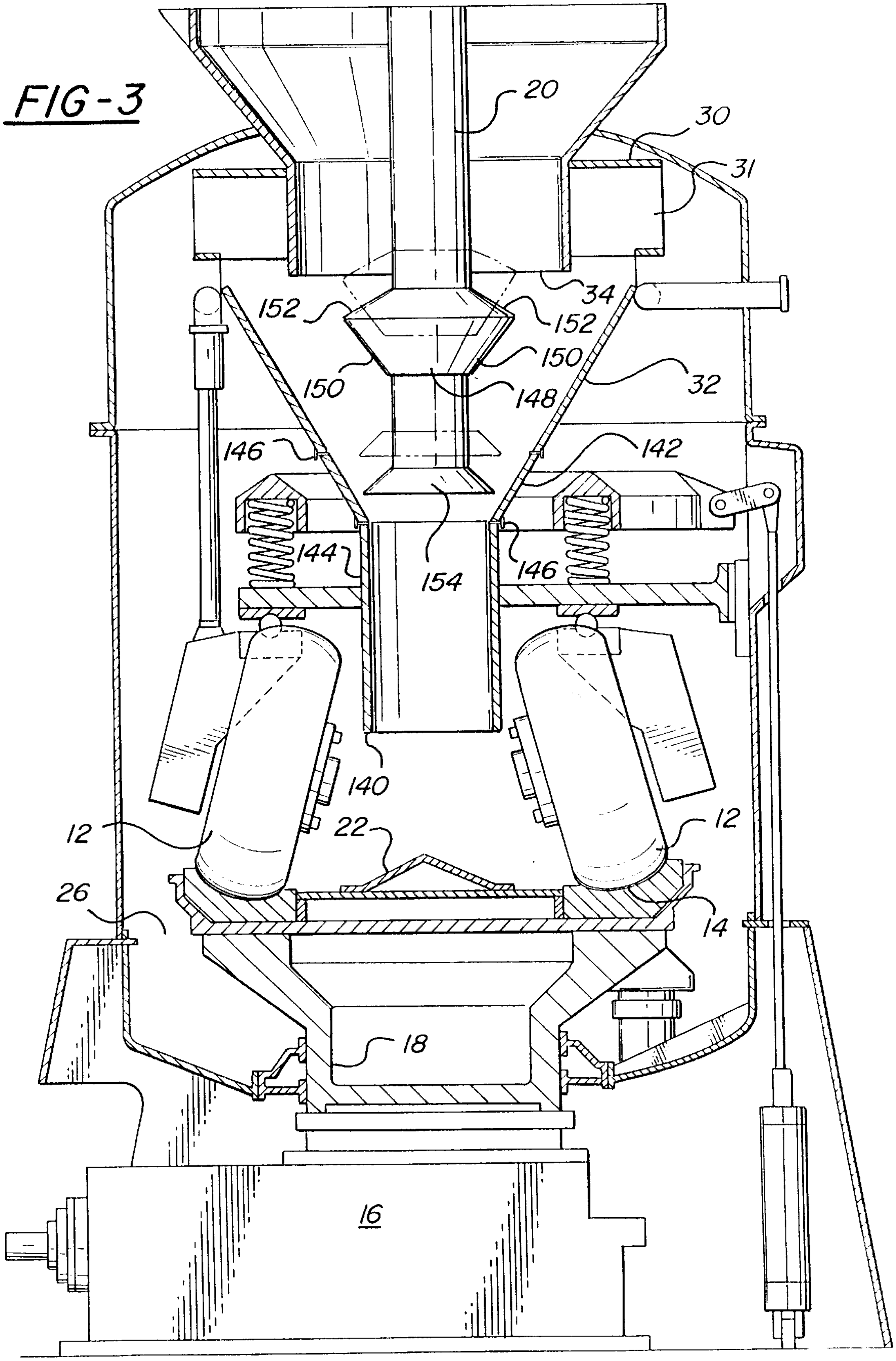
FIG. 3 is a side section view of a classifier system according to the present invention, also in a bowl mill pulverizer.

By way of further explanation, when classifier venturi 148 is in the lower position shown in solid lines in FIG. 3, the exit angle of the lighter fines swirling in the upper part of cone 32 is essentially parallel to upper venturi surfaces 152 and accordingly at a relatively sharp angle relative to chute 34. When classifier venturi 148 is in the raised position shown in dotted lines in FIG. 3, with the upper leading edges of lower surfaces 150 essentially even with the plane of the inlet of delivery chute 34, the exit angle is essentially vertical and parallel to chute 34.

The lower venturi surfaces 150 of venturi 148 further act as angled deflectors, contacting the coal as it exits the cone near chute 34 and significantly slowing down larger particles of coal entrained in the exit flow. This reduces their velocity and causes them to drop back into the classifier cone for regrinding.

The dual-surfaced venturi 148 creates a complementary relationship between the exit angle and exit velocity of the coal flow leaving cone 32 via chute 34. As venturi 148 is raised to increase exit flow velocity, the simultaneous change in the exit angle toward the vertical results in a greater deflection of the centrifugally-swirling coal in the upper portion of cone 32 by surfaces 150. Accordingly, while undesirable larger coal particles may tend to be prematurely classified with the exit flow due to the higher escape velocity, they are also more likely to strike and be decelerated by lower surfaces 150 during the transition from radially swirling classification flow essentially perpendicular to delivery chute 34 to a nearly vertical exit flow.

The increase in exit flow velocity through delivery chute 34 is largely dictated by the flow rate needed by the combustion chamber.

An adjustable clearance cone 154 is also provided on the lower end of feedpipe 20 adjacent the throat of cone extension 140 at portion 142. Clearance cone 154 is also vertically adjustable on feedpipe 20.

Referring now to FIG. 3, the present invention is illustrated for solving dimensional flow problems which can occasionally arise with the feedpipe extension and cone extension structure 136, 140 of FIG. 2 where, for example, the original feedpipe 20 has an oversize diameter relative to the dimensions of the original classifier cone structure 32 and the cone extension 140, particularly tailing section 144. In the case of an oversize original feedpipe or feedpipe extension, for example needed to maintain a desired rate of raw coal feed into the pulverizer, the annular flow path between the wall of the feedpipe extension and the throat 147 and tailing section 144 of cone extension 140 may be reduced to the point where the return of reject fines from the classifier cone to the pulverizer is hindered or even blocked.

To prevent this from occurring, feedpipe 20 is maintained at its original length while classifier cone extension 140 is added to the classifier cone structure. Alternately, a shortened feedpipe extension 136 can be used where the position of the feedpipe outlet needs to be adjusted relative to the cone extension. Whether the original feedpipe or a shortened extension is employed, the feedpipe outlet terminates above the throat 147 of the classifier cone extension 140, preferably within the cone extension as shown relative to region 142. This eliminates the undesirable reduction in the reject fine flow path which would be created by an oversize feedpipe extension extending through the throat and into the tailing portion 144 of the classifier cone extension 140. At the same time, the benefits of the classifier cone extension as described above are maintained. The positioning of the feedpipe outlet near the throat within the classifier cone extension, in the illustrated embodiment within the cone-shaped upper region of the extension, also helps to maintain some of the beneficial “draw” effect of the raw coal feed from the feedpipe on the flow of reject fines from the classifier cone.

The adjustable clearance cone 154 is retained on the lower or outlet end of feedpipe 20 (or its shortened extension) adjacent the throat of cone extension 140. Clearance cone 154 is vertically adjustable on feedpipe 20 to adjust the gap or annular flow path of the reject fines from the classifier cone around the feedpipe outlet near the throat of cone extension 140. Clearance cone 154 can also be used to adjust the degree to which the flow of raw coal from the feedpipe outlet and reject fines from classifier cone 32 are isolated from one another in the throat region. This helps maintain some of the control over the interaction of raw coal feed and reject fines otherwise provided by the long feedpipe extension 136 of FIG. 2.

The foregoing description is of an illustrative embodiment of the invention, and is not intended to limit the scope of the invention to those specific structures set forth for purposes of illustration. Various forms and modifications of the inventive structure will lie within the scope of the appended claims.

I accordingly claim:

1. In a coal pulverizer having a classifier system, the system including a coal feedpipe to deliver raw coal to pulverizing structure from an outlet spaced above the pulverizing structure, a classifier cone positioned around the feedpipe to deliver oversize coal to the pulverizing structure from a classifier cone outlet spaced above the pulverizing structure, the pulverizer delivering ground coal to an upper end of the classifier cone by an upwardly-directed flow of air traveling around and above the pulverizing structure, the improvement comprising:

a classifier cone extension extending from the classifier cone outlet into the pulverizing structure to a point where coal flow from the classifier cone extension is not affected by the flow of air up and around the pulverizing structure from the pulverizing throat, the cone extension having a throat, and the feedpipe outlet being positioned within the cone extension above the throat, wherein the feedpipe is mounted vertically within the classifier cone concentric with the cone extension and throat to define an annular reject fine flow path between the feedpipe outlet and the classifier cone extension above and adjacent the throat.

2. The apparatus of claim 1, wherein the classifier cone extension includes a cone-shaped portion contiguous with the classifier cone, and a cylindrical tailing section extending from the cone shaped portion, the throat being defined at a junction of the cone-shaped portion and the cylindrical tailing section.

3. The apparatus of claim 2, wherein the feedpipe outlet is located in the cone-shaped portion of the classifier cone extension above the cylindrical tailing section.

4. The apparatus of claim 1, further including an adjustable clearance device mounted for vertical adjustment relative to the feedpipe outlet on a lower end of the feedpipe near the feedpipe outlet to adjust the annular flow path between the feedpipe and the classifier cone extension.

5. The apparatus of claim 1, wherein the feedpipe includes a short feedpipe extension defining the feedpipe outlet.

6. In a coal pulverizer having a classifier system, the system including a coal feedpipe to deliver raw coal to pulverizing structure from an outlet spaced above the pulverizing structure, a classifier cone positioned around the feedpipe to deliver oversize ground coal to the pulverizing structure via intermittent discharge structure from an outlet spaced above the pulverizing structure, and a combustion delivery chute positioned around the feedpipe above the classifier cone, the pulverizing structure delivering ground coal to an upper end of the classifier cone by an upwardly-directed stream of air traveling around and above the pulverizing structure, a method for improving the flow of coal throughout the classifier system comprising the following steps:

replacing the intermittent discharge structure in the classifier cone with a classifier cone extension extending from the classifier cone outlet into the pulverizing structure to a point where coal flow from the classifier cone extension is not affected by the flow of air up and around the pulverizing structure from the pulverizer throat, the cone extension having a throat; and, locating the feedpipe outlet within the classifier cone extension above and adjacent to the throat such that the feedpipe is concentric with the cone extension and throat to define an annular reject fine flow path between the feedpipe outlet and the classifier cone extension above and adjacent the throat.

7. A method as defined in claim 6, wherein the classifier cone extension includes a cone-shaped portion contiguous with the classifier cone, and a cylindrical tailing section extending from the cone-shaped portion, the throat being defined at a junction of the cone-shaped portion and the cylindrical tailing section.

8. A method as defined in claim 6, further including the step of mounting an adjustable clearance device for vertical adjustment relative to the feedpipe on the lower end of the feedpipe near the feedpipe outlet to adjust the annular flow path between the feedpipe and the classifier cone extension.

9. A method as defined in claim 6, wherein the step of locating the feedpipe outlet within the classifier cone extension includes the step of adding a short feedpipe extension to the feedpipe.

10. A method as defined in claim 6, wherein the step of locating the feedpipe outlet includes the step of locating the feedpipe outlet in the cone shaped portion of the classifier cone extension above the cylindrical tailing section.

* * * * *